United States Patent [19]

Luzier et al.

[11] 3,974,338

[45] Aug. 10, 1976

[54] APPARATUS FOR AUTOMATIC MESSAGE REPROGRAMMING OF A MESSAGE ANNOUNCEMENT SYSTEM

[75] Inventors: Harman E. Luzier, Lawrenceville; Jon C. Colt, Tucker; Douglas R. Cobb, Dunwoody, all of Ga.

[73] Assignee: The Audichron Company, Atlanta, Ga.

[22] Filed: June 25, 1973

[21] Appl. No.: 373,086

[52] U.S. Cl. .............................. 179/6 C; 340/152 R
[51] Int. Cl.² ................. H04M 11/10; G11B 31/00; H04Q 9/02
[58] Field of Search............. 179/100.1 C, 100.1 PS, 179/6 C, 6 TA, 6 R, 100.2 MD; 340/152 R; 235/61.12 M

[56] References Cited
UNITED STATES PATENTS

| | | | |
|---|---|---|---|
| 2,530,076 | 11/1950 | Peterson............................ | 179/6 TA |
| 2,561,602 | 7/1951 | Valentino et al. ............ | 179/100.1 C |
| 2,859,281 | 11/1958 | Quatman.............................. | 179/6 C |
| 2,995,630 | 8/1961 | Kabrick et al.............. | 179/100.1 PS |
| 3,086,086 | 4/1963 | Ernst et al. ................ | 179/100.2 MD |
| 3,122,722 | 1/1964 | Subry et al....................... | 340/152 R |
| 3,129,407 | 4/1964 | Paull ................................. | 340/152 R |
| 3,214,520 | 10/1965 | Avakian et al....................... | 179/6 C |
| 3,291,919 | 12/1966 | Robitaille.................... | 179/100.1 PS |
| 3,294,924 | 12/1966 | Fein........................... | 179/100.2 MD |
| 3,366,946 | 1/1968 | Cohen.............................. | 340/152 R |
| 3,383,658 | 5/1968 | Martin et al. ..................... | 340/152 R |
| 3,488,443 | 1/1970 | Smith.......................................... | 179/6 |
| 3,541,271 | 11/1970 | Joslow et al................ | 179/100.1 PS |
| 3,587,180 | 6/1971 | Richt ................................. | 360/74 |
| 3,684,834 | 8/1972 | Bryant, Jr. ........................... | 179/6 C |
| 3,794,767 | 2/1974 | Todd................................... | 179/6 R |
| 3,886,590 | 5/1975 | Walker................................. | 179/6 C |

*Primary Examiner*—Daryl W. Cook
*Assistant Examiner*—Robert M. Kilgore
*Attorney, Agent, or Firm*—Jones, Thomas & Askew

[57] ABSTRACT

Apparatus for automatically substituting one or more messages for a corresponding number of messages previously available for delivery by a message announcement system. The initial messages may be contained on a message announcement system of the type which periodically and repetitively makes one or more separate messages available for delivery to a message delivery system such as a telephone system. The present message reprogramming apparatus provides substitute messages serially disposed on a recording medium along with associated control signals corresponding to the individual substitute messages. The medium containing the substitute messages is controlled to serially deliver each message in response to a time normally used for delivery of the corresponding initial message by the message announcement system, so that the substitute message is synchronously available for recording onto the message announcement system to replace the initial message, and also for delivery to a message delivery system in lieu of the initially-recorded message on the message announcement system. The present reprogramming apparatus can contain several sets of substitute messages, and is operable to substitute one of the message sets at each daily or other desired interval. The message reprogramming apparatus may include more than one substitute message playback mechanisms, with automatic switching between playback mechanisms in response to complete utilization of all substitute messages contained on a first playback mechanism.

24 Claims, 4 Drawing Figures

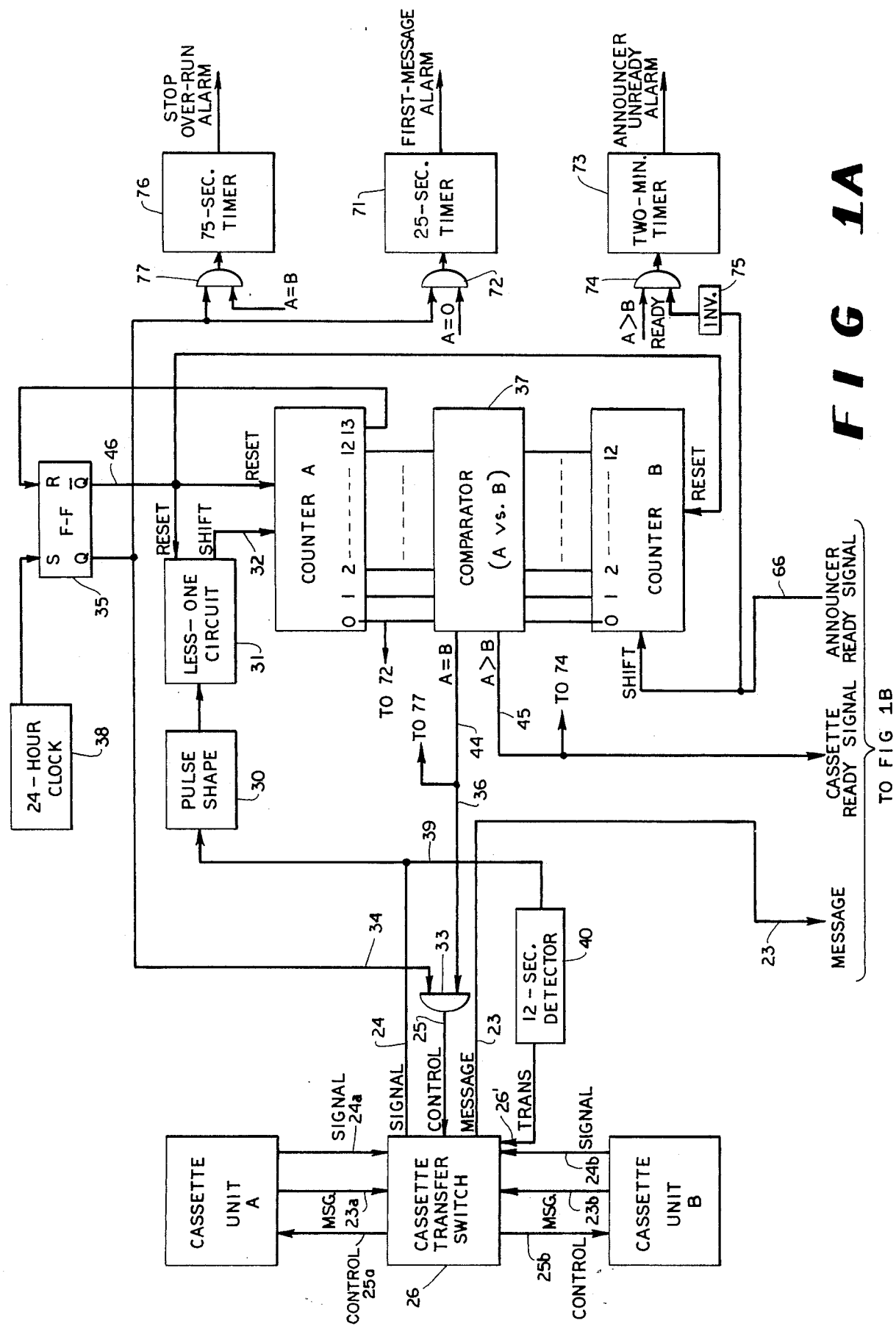

3,974,338

APPARATUS FOR AUTOMATIC MESSAGE REPROGRAMMING OF A MESSAGE ANNOUNCEMENT SYSTEM

This invention relates in general to message reprogramming systems and in particular to apparatus for providing a message announcement system with messages in substitution of initially-recorded messages.

Message announcement systems and apparatus are used in many applications where it is desired to make available one or more messages for delivery to a particular location or to a subscriber-controlled message delivery system such as a telephone switching system. Message announcement systems generally contain recording apparatus, such as magnetic drums, belts, or other media, upon which one or more messages are recorded. Movement of the recording medium relative to a playback transducer reproduces the message for subsequent delivery through amplifiers and other circuitry which are known to those skilled in the art. Although such announcement apparatus can be used in a variety of applications, the better-known applications of message announcement equipment include "time of day" and "weather" message announcements which are provided by dialing a particular telephone number providing interconnection with an announcing system containing the appropriate prerecorded messages.

Although some message announcement systems such as time-of-day systems contain prerecorded fixed message segments from which the desired total message is automatically compiled for proper composite delivery, there are many applications for message announcement systems which call for the delivery of a general-purpose message. Examples of such applications are provided by services wherein a caller, by dialing a particular number, may obtain a brief prerecorded summary of a movie currently playing at a particular theatre. Still another example enjoying current popularity is so-called horoscope service, wherein a person dials a particular telephone number corresponding to his astrological sign and receives a prerecorded message pertinent to that astrological sign. It will be apparent that such general-purpose recorded announcements must be periodically changed to receive a new message in substitution of a previously-prerecorded message; in the case of horoscope announcement service, in particular, it is desirable to provide a new prerecorded message on a daily basis for each astrological sign.

Although reprogramming of general-purpose messages on message announcement systems has been accomplished, prior-art systems and techniques for such reprogramming have been unsatisfactory for many types of applications. One known type of message reprogramming requires interconnection between the message announcement system and a special telephone circuit for reprogramming purposes. When message substitution is desired, a person uses the special telephone circuit and is connected to reprogramming circuitry within the message announcement system. The announcement system typically signals its readiness to receive and record a message by means of a tone signal supplied over the special telephone circuit, whereupon the calling person then dictates the new or substitute message over the telephone and this message is recorded on the announcement system in place of the initial message. Messages reprogrammed in this manner suffer the speech quality limitations which are imposed by the carbon microphone in the telephone transmitter, and by the voice-grade telephone connection between the calling person and the message announcement apparatus. In the case of a horoscope announcement service having twelve separate prerecorded messages which must be replaced daily by substitute messages, it can be seen that twelve separate special telephone circuits must be maintained for accomplishing reprogramming of the individual announcements. Moreover, the need for a person to go through the routine of making numerous reprogramming telephone calls on a daily basis becomes onerous and troublesome, especially if he flubs his live delivery of one or more substitute messages and has to repeat the substitution procedure.

Since many recorded message announcements are actually initially recorded on high-quality equipment in a professional recording studio, using the voice of a trained professional announcer, it has been suggested that the aforementioned message substitution be accomplished by the expedient of removing the entire recording medium containing the initial messages and substituting another recording medium containing the desired professionally-recorded substitute messages. The recording medium on the typical message announcement system consists of one or more continuous-medium devices such as drums, belts, or the like, which are designed for continuous-duty operation and which are, accordingly, too expensive to be removed and discarded following message substitution. Moreover, the need for daily reprogramming of a message announcement system by substituting a new recording medium would require the daily personal attention of a technician.

Accordingly, it is an object of the present invention to provide improved reprogramming of message announcement equipment and systems.

It is another object of the present invention to provide apparatus for automatic message reprogramming of a message announcement system.

It is still another object of the present invention to provide apparatus for transferring substitute messages from a first message medium to a second message medium.

It is still another object of the present invention to provide a recording medium containing a number of prerecorded substitute messages.

Other objects as well as many of the attendant advantages of the present invention will become more apparent from consideration of the invention as found in the following disclosed embodiment, including the annexed drawings in which:

FIGS. 1A and 1B show a schematic diagram illustrating the disclosed embodiment of the invention;

Figure 1B:
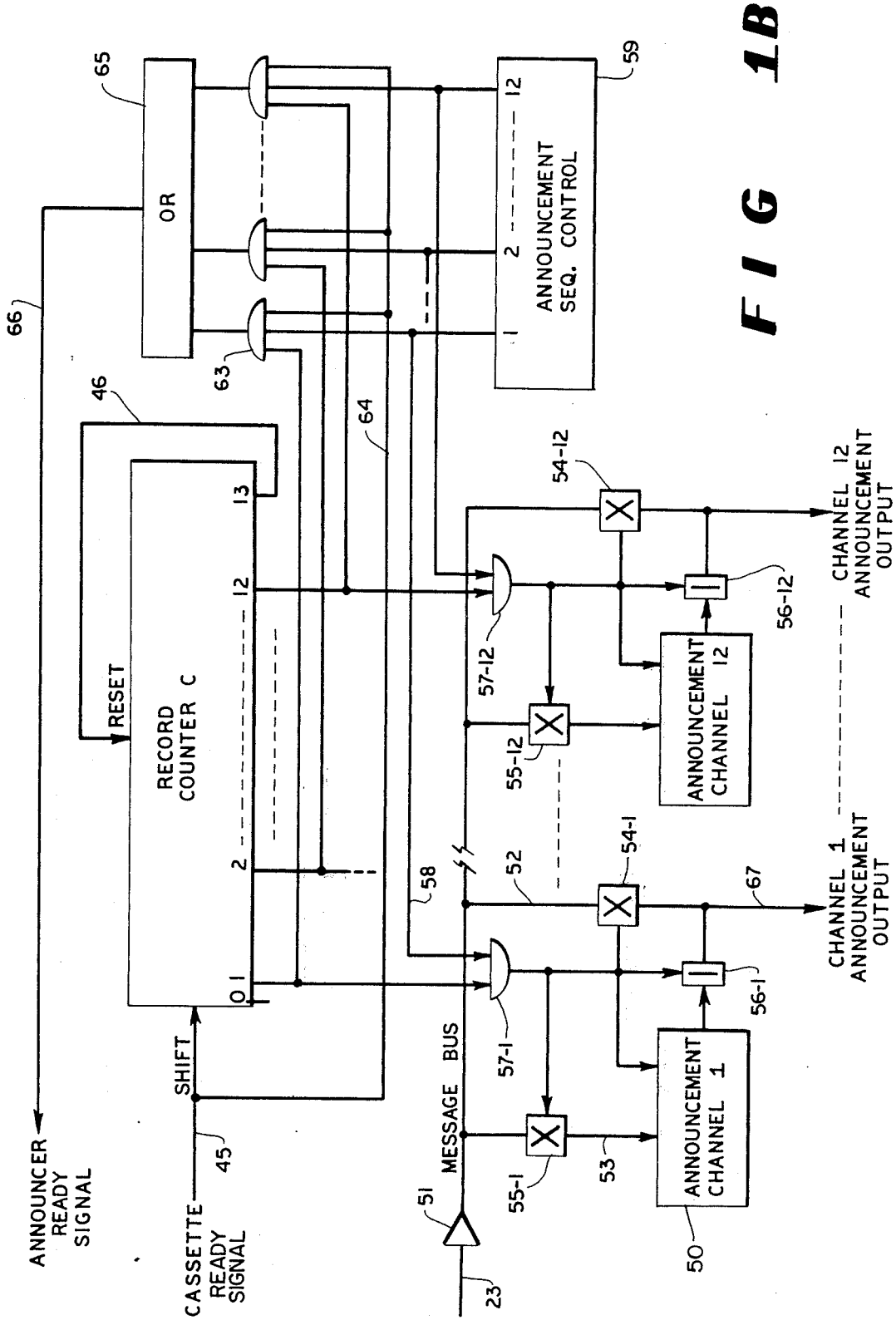

Stated in general terms, the message reprogramming apparatus of the present invention includes at least one mechanism for storing and serially delivering a number of separate substitute messages, with the initiation of substitute message delivery being responsive to a signal from a clock or other device. The substitute messages are delivered to a message announcing apparatus for recording thereon in place of a previously-recorded message. Delivery of each substitute message occurs coincident with and responsive to the time for commencement of delivery of the initial message to be replaced by the substitute message. Substitute message delivery is halted in response to control signals recorded on the substitute message medium and corresponding to the end of each separate substitute message, so that subsequent delivery of the next serial substitute message does not prematurely occur. The end of delivery of a set of substitute messages controls termination of a given message substitution cycle, and the apparatus thereafter is inoperative until delivery of the next initiation signal from the clock or other device. Where a particular type of substitute message recording medium lacks sufficient capacity to store a desired number of substitute messages, more than one separate substitute message mechanism may be used in conjunction with appropriate circuitry.

The present invention is more particularly understood with reference to the specific operating embodiment shown in the Figures. For purposes of the following discussion of the disclosed embodiment of the automatic message reprogramming invention, it is assumed that the disclosed embodiment is connected and operated in association with a message announcement system which may be of a type known to the art and which operates to repetitively deliver a number of separate prerecorded messages. Such prior-art message announcement apparatus typically, although not necessarily, includes a magnetic oxide-coated drum, belt, or other recording medium which is continuously moved relative to a transducer. In the case of a drum-type recording medium, for example, the transducer can move either along an annular path on the message surface of the drum or can move on a spiral path therealong to define a greater extent of message length for a given drum circumference and rotational speed. A particular message is prerecorded at a predetermined starting location on the recording medium, and the message announcement system is operative to produce a control signal at or immediately preceding movement of the transducer past the starting location, thereby signaling delivery of a particular prerecorded message. This control signal, as is known to those skilled in the art, can be obtained either from a signal track recorded on the recording medium in conjunction with the message announcement track, or may alternatively be provided by apparatus responsive to the occurrence of a particular rotational position of the recording medium. The control signal which occurs in conjunction with commencement of a message announcement is frequently known in the art as a "cut-through" or CT pulse, and is frequently used in conjunction with other circuitry to establish interconnection between the announcement apparatus and telephone circuits desiring interconnection with a particular announcement circuit. Message announcement systems per se are known to those skilled in the art, and such systems are shown in the following description only to the extent necessary to provide interface details with the present automatic message reprogramming apparatus.

Although any suitable recording medium can be used to store the substitute messages, the use of so-called Philips-type tape cassettes for the substitute messages provides a recording medium which is in general use and is readily mailable to prospective users. Equipment for recording and playback with Philips-type cassettes is generally available, and such cassettes are easily inserted into cassette tape players by technically unskilled persons without requiring threading or other manual adjustment.

Figure 2:
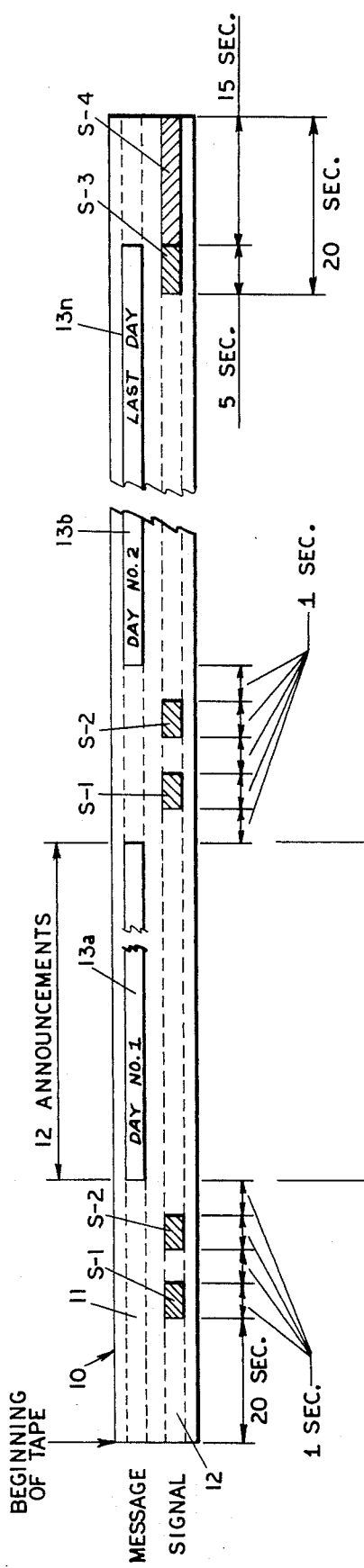
FIG. 2 shows a time diagram illustrating a disclosed embodiment of substitute message and control signal format.

A schematic outline of substitute messages and corresponding control signals recorded on a length of two-track tape, contained in a typical substitute message cassette of the disclosed embodiment, is depicted in FIG. 2. A length of tape shown generally at 10 has a message track 11 and a signal track 12 extending along the length of the tape, it being understood that the message track may comprise a number of separate recorded messages interrupted by lengths of tape containing no recorded message, and that the signal track may correspondingly contain recorded signals at predetermined locations and may contain no recorded information at other locations. Announcement message reprogramming occurs once each day, in the described embodiment, and so the message track 11 contains a number of substitute message sets each of which is made up of one or more separate recorded substitute messages. The first occurring substitute message set, intended for first day reprogramming, is shown at 13a on the message track 11, with the beginning of the second-day message set shown at 13b and the end of the last-day message day shown at 13n. The signal track 12 contains two separate initial control signals S-1 and S-2 immediately preceding the commencement of only the first message in each substitute message set, and it can be seen from the left-side portion of FIG. 2, corresponding with the beginning of the tape 10, that the two initial control signals S-1 and S-2 are the first signals recorded on the tape. The purpose of these two initial control signals will become apparent below.

Each of the individual substitute message sets 13a, 13b, . . ., 13n typically consists of several individual separate substitute messages serially disposed on the message track 11, as shown in detail in the expanded view 16 of the first-day substitute message set 13a. This first-day message set contains separate individual messages 17, including a final message 17', for a total of 12 separate messages in the disclosed embodiment. It is not essential to the present invention that the separate messages 17 be of equal duration, and in practice the maximum duration of the separate substitute messages will be determined by the maximum duration of message which can be received by the message announcement system with which the present message reprogramming apparatus is used. The signal track 12 contains a single message end signal S-3 in certain timed relation with the actual end of each corresponding message 17 contained on the message track 11. In the disclosed embodiment, each of the message end signals S-3 is provided by a recorded signal condition of five-seconds duration, terminating exactly at the same time that the corresponding message 17 terminates. It will be appreciated that the trailing edge of each end signal S-3 is utilized for control purposes in the disclosed embodiment.

At the end of the final separate message which comprises the last-day message set 13n, the 5-second end signal S-3 is present as described above with reference to the expanded view 16, and an additional signal S-4 is also present on the signal track 12 of the tape. This additional signal S-4, which in the disclosed embodiment is provided by a continuation of the five-second end signal S-3 for an additional fifteen seconds, provides a tape end signal indicating that no additional messages or control signals are recorded on the tape. It will be understood, of course, that conventional end-oftape devices such as electrically conductive strips or the like may also be used to provide either primary or back-up indication that the tape 10 has ended.

Each of the various control signals S-1, S-2, S-3, and S-4 are provided in the disclosed embodiment by 200 Hz tones. The number, occurrence, and/or duration of the several control signals enables the signals to be differentiated with the apparatus to be described below, although it will be understood that control signals of different frequencies can alternatively be used in conjunction with frequency discrimination apparatus to provide the disclosed functions of initial control signal, message end signals, and tape end signals.

Turning to FIG. 1A for a description of the disclosed embodiment of automatic message reprogramming apparatus utilizing a substitute message tape as shown in FIG. 2, there is shown a first tape cassette unit A and a second tape cassette unit B. Each of these tape cassette units A and B may be of conventional design and construction, having corresponding message outputs 23a, 23b and signal outputs 24a, 24b on which are provided the respective messages and signals recorded on the message track 11 and the signal track 12 of a tape cassette received within the respective cassette units for playback. Each of the cassette units receives a control input 25a, 25b controlling the playback operation of the cassette unit. It will be understood that either of the cassette units will operate in response to a control input to play back a cassette loaded into the respective cassette unit. The message and signal outputs of each cassette unit A and B, as well as the control inputs to these cassette units, are supplied to a cassette transfer switch 26, which operates in response to a transfer signal applied to the transfer line 26' to interconnect either cassette unit A or cassette unit B to the message line 23, the signal line 24, and the control line 25 of the transfer switch. It will be seen that the cassette transfer switch 26 is functionally a multiple-pole double-throw switch which accomplishes the foregoing circuit transfer, and it will be understood that the cassette transfer switch may be comprised by a number of individual switching elements to accomplish the aforementioned transfer of audio-message signals and tone control signals (both as delivered from the cassette units) and cassette unit control signals. The reason for providing two separate cassette units A and B, in conjunction with the cassette transfer switch 26, is made apparent hereinbelow.

The message output line 23 provides an audio signal to the portion of the apparatus contained on FIG. 1B. The signal output line 24 is connected to a pulse shaping circuit 30, where the tone signals are amplified and shaped by appropriate circuitry to provide pulses of uniform shape for subsequent utilization. The output from the pulse shaping circuitry is supplied to a less-one circuit 31, which functions to absorb the first pulse received and to pass on subsequently-received pulses on a one-to-one basis. The output of the less-one circuit 31 is connected to the shift input 32 of counter A.

The control line 25 of the cassette transfer switch 26 is connected to the output of a coincidence gage 33. One input 34 of the coincidence gate 33 is connected to receive the "set" output of the flip-flop 35, while the other input 36 of the coincidence gate is connected to receive the A = B output 44 of the count comparator 37.

The flip-flop 35 functions to initiate each message substitution cycle, and the "set" input S of the flip-flop is accordingly connected to receive an input at intervals appropriate to the desired message substitution. The set input to the flip-flop 35, in the disclosed embodiment, is provided by a 24-hour clock 38, which functions to provide a "set" signal once in every 24-hour interval. It will be understood that a manual "set" input can be additionally or alternatively provided to set the flip-flop 35.

The signal output line 24 is also connected by the line 39 to the input of the 12-second detector 40, which functions to provide a cassette transfer switching signal along the line 26' in response to the receipt of an uninterrupted control signal of at least 12 seconds duration.

The counter A and the counter B are each of the type which provides a particular digital count signal condition which is sequentially shifted in response to input pulses applied to the shift input. Each of the counters A and B, in the present embodiment, may be provided by 4-bit binary counters, although counter A requires only fourteen output counts designated "zero" to "thirteen," inclusive, and counter B requires outputs from "zero" to "twelve," inclusive. As will be apparent, however, the magnitude of maximum count in each counter is a function of the total number of messages to be serially delivered in each substitute message reprogramming cycle.

The outputs of counter A and counter B are connected to the digital magnitude comparator 37. The comparator 37 provides a certain digital signal condition on the A = B output 44, when both counter A and counter B have the same numerical count, and places a certain digital output condition on the A>B output 45, when counter A contains a count exceeding that of counter B. The "thirteen" output of counter A is connected as an input to the "reset" input R of the flip-flop 35. The reset output $\overline{Q}$ of the flip-flop 35 is supplied on the line 46 to provide reset inputs to the less-one circuit 31, and the counters A and B. The less-one circuit 31 is reset in response to this reset input to again be available to absorb the first input pulse applied thereto and to pass on subsequent input pulses to the shift input 32 of the counter A.

The A>B signal is supplied along the line 45 as a cassette ready signal to the portion of the apparatus shown in FIG. 1B. The cassette ready signal is applied to the shift input of a counter C, which is referred to as a record counter and which operates in a manner similar to counter A to sequentially shift outputs from a zero output to a thirteen output (for the disclosed embodiment). The thirteen output is connected by the line 46 to reset the record counter C.

Each of the outputs of the record counter C, except for the zero and thirteen outputs, is connected to provide a control signal to an individual message announcement circuit. The zero output is unused. The individual message announcement circuits may be provided either by a multichannel announcement apparatus which is capable of recording and delivering a number (twelve, in the present example) of separate messages, or may alternatively be provided by twelve separate message announcement apparatuses.

Considering announcement channel one for illustrative purposes, the apparatus providing the announcement function for that channel is diagrammatically shown in FIG. 1B by the box 50, and it will be understood that this announcement channel includes a suitable erasable recording medium along with control circuitry which accomplishes the erase and record functions, in response to applied control and message inputs. The message signal applied on the line 23 from either of the cassette units is applied to an amplifier 51 which applies an applied signal on the message bus. The amplified message signal on the message bus is supplied through the switch 55-1 as a message input to the record input 53 of announcement channel one, and is additionally supplied through the line 52 to the switch 54-1. The message announcement which is normally delivered by announcement channel one is supplied through the switch 56-1 to the channel one announcement line 67.

The operation of the switches 54-1, 55-1, and 56-1 is controlled in response to the output of the coincidence gate 57, which receives a first input from the one output of the record counter C and a second input along the line 58 from the one output of an announcement sequence control 59. The announcement sequence control 59 is any circuit or arrangement of circuits which sequentially provide a control signal condition on each of the number of outputs corresponding in number to the number of message announcement channels to be reprogrammed, with each output of the announcement sequence control being timed to occur in certain predetermined relation to the commencement of the message announcement normally delivered by the corresponding message announcement channel. Preferably, each output signal from the announcement sequence control 59 will occur immediately preceding the commencement of message delivery by the corresponding announcement channel. In the case of multi-channel announcement apparatus wherein a single recording medium, such as a rotating drum, is used in conjunction with a number of separate message tracks and transducers to deliver the separate message announcements, it will be understood that the announcement sequence control may be already functionally incorporated in the message announcement system and correlated with the relative movement of the recording medium and the several transducers. Such a multi-channel announcement apparatus incorporating apparatus which provides the sequence of output signals associated with the announcement sequence control 59 is described in U.S. Pat. No. 3,886,590. The master timer shown in FIG. 8 of Patent No. 3,886,590 provides sequentially-occurring synchronizing pulses P-2 along output lines which are designated T-1 through T-12, and these synchronizing pulses control the sequential operation of a corresponding number of message announcement channels as described in that patent. The announcement sequence control 59 of the presently-disclosed embodiment delivers control signals in sequence from output one through output twelve, the same sequence of occurrence of the serially-disposed separate messages 17 which make up each substitute message set 13 on the tape 10. It is seen that the output from the coincidence gate 57 is also connected to announcement channel one to activate circuitry such as an erase amplifier and the like, conventionally associated with erasing and recording magnetic media. If the output signals from the announcement sequence control 59 are pulses of duration less than the message announcement period allotted for each announcement channel, then the coincidence gates 57-1 through 57-12 must be operative to become set by considering input signals and to become reset by termination of the input signal from the counter C.

The one output of the announcement sequence control is also connected as an input to a coincidence gate 63, which additionally receives an input from the one output of the record counter C and an input along the line 64 from the A>B line 45. Each of the other outputs of the announcement sequence control 59 is similarly connected to a coincidence gate which also receives inputs from the line 64 and the correspondingly-numbered output of the record counter C; the outputs of these coincidence gates are connected to the OR gate 65, and the output of the OR gate is supplied along the line 66 to provide the "announcer ready" signal for the shift input to the counter B, FIG. 1A.

Each of the remaining announcement channels will have message substitution circuitry corresponding to that described for channel one, although such circuitry is depicted and correspondingly numbered for channel twelve only.

Considering the operation of the apparatus as disclosed thus far, it is assumed that all of counters A, B, and C are initially set to a zero-count state, and it is further assumed that the cassette unit A, for example, has been loaded with a cassette having recorded messages and signals as previously described with reference to FIG. 2. The flip-flop 35 is in the reset state at this time, and so the input 34 to the coincidence gate 33 is at a zero logic state. Accordingly, no control signal is applied on the control input 25 through the cassette transfer switch 26 and the control input 25a to the cassette unit A, with the result that the cassette unit A is inoperative. As soon as the flip-flop 35 receives a signal at its set input from the clock 38, or from any other appropriate source, the Q output of the flip-flop is applied to the input 34 of the coincidence gate 33. Since counters A and B both are assumed to have a zero output at this time, the coincidence gate 33 also receives a one logic signal from the A=B output 44 of the comparator 37, and so the coincidence gate 33 provides a logic one on the control input 25. This input is applied on the line 25a to the cassette unit A, whereupon playback operation of the tape 10 commences. Referring to FIG. 2, it will be seen that the two initial control signals S-1 and S-2 are delivered along the signal output 24 to the pulse-shaping circuit 30 and thence to the less-one circuit 31. The first initial pulse S-1 is absorbed or lost in the less-one circuit, and the second initial control signal S-2 passes through the less-one circuit to be applied as the first shift input to the counter A. Counter A is shifted to provide an output at its one output in response to this first shift input, with the result that the A=B signal disappears from the line 44 and from the coincidence gate 33, and the control signal input is removed from the cassette unit A. Operation of cassette unit A is thus interrupted and the message track 11 of the tape 10 is presently at a point immediately preceding occurrence of the first serial message 17 of the first substitute message set 13a.

Since counter A now has a one output, signifying the availability of the first substitute message, and counter B still has a zero output, a logic one is now present on the A>B output line 45 of the comparator 37. This condition on the line 45 is applied as a cassette-ready signal to shift the record counter C from the zero count to the one count. The one count of the record counter C is applied as an input to the coincidence gate 57-1 associated with announcement channel one. The apparatus is now ready to commence delivering the first substitute message, and awaits the arrival of a signal from the announcement sequence control denoting the commencement of the message announcement regularly contained on the announcement channel one.

The announcement sequence control of the type utilized in the aforementioned multichannel announcing apparatus may be repetitively cycling through its twelve output conditions corresponding to delivery times of the respective twelve announcements normally delivered by the message announcement apparatus. When the output signal corresponding to announcement channel one is delivered by the announcement sequence control 59, the coincidence gate 63 receives that output signal in addition to the one signal from the record counter C and the cassette-ready signal already present on the line 64. The resulting output of the coincidence gate 63 is applied through the OR gate 65 and along the line 66 as an "announcer-ready" signal to shift counter B to a one count. Counters A and B now both have a one count, and so the cassette-ready signal disappears from the line 45 and the A = B signal reappears on the line 44. A control signal is again applied along the control line 25 and 25a to the cassette unit A, whereupon cassette unit A recommences playback operation to deliver of the first message 17. This first message is applied along the message output 23, FIGS. 1A and 1B, through the amplifier 51, and thence to the message bus.

Since the coincidence gate 57-1 has received coincident one signals on both inputs, the switch 55-1 is closed to connect the message bus to the channel one record input 53. The first substitute message 17 is thus being received by the conventional erase-record circuitry of announcement channel one, and so the first substitute message 17 is recorded on announcement channel one in place of the message previously recorded on that announcement channel. At the same time, the switch 54-1 becomes closed and the switch 56-1 becomes opened, so that the substitute message 17 becomes available for delivery at the same time that announcement channel 50 is receiving this substitute message. In this manner, any person seeking access to the message contained on message announcement channel one during the time of reprogramming will automatically receive the substitute message.

Delivery of the first substitute message 17 continues until the end signal S-3 associated with that message occurs. Since the end signals S-3 terminate coincident with termination of each corresponding separate message 17, in the disclosed embodiment, the pulse-shaping circuit 30 is responsive to the trailing edge of the end signal S-3 to produce an output pulse which passes through the less-one circuit 31 (which has previously "absorbed" the first initial control signal S-1) to shift counter A from the one count to the two count. The A = B signal again disappears from the output 44 of the comparator 37, causing the cassette unit A to stop, and the cassette-ready signal reappears on the A>B output 45 of the comparator. The cassette-ready signal on the line 45 shifts the record counter C to the two count, with the result that the switches 54-1, 55-1, and 56-1 revert to the original states and the recording mode operation associated with announcement channel one become inactive. Message substitution is now completed on announcement channel one, and the apparatus stands ready to deliver the next separate substitute message to the next announcement channel in response to the occurrence of a two output of the announcement sequence control 59. Announcement channel one will operate in the conventional manner to deliver the subject message which was just recorded thereon from cassette unit A.

Assuming for the moment that the cassette associated with the cassette unit A contains all twelve separate messages in the substitute message set 13a, the foregoing operative steps continue until the final individual message twelve has been delivered. The end signal S-3 signaling the end of the twelfth substitute message steps counter A to its thirteen output, whereupon the flip-flop 35 becomes reset to remove the Q output signal from the coincidence gate 33 and to apply the $\bar{Q}$ signal along the line 46. The $\bar{Q}$ signal functions to reset the less-one circuit 31 (which once again becomes available to "absorb" a first pulse applied thereto), counter A, and counter B. As soon as counter A became shifted to its thirteen count position, the momentary occurrence of a cassette-ready signal on the line 45 stepped the record counter C to its thirteen count position, whereupon a signal was applied along the line 46 to reset record counter C to zero. All three counters are now at zero, and an A = B signal is applied to the coincidence gate 33. However, the absence of a Q signal on the input 34 of the coincidence gate 33 prevents any further operation of the cassette unit A at this time. It will be seen, accordingly, that the disclosed apparatus is now in the state initially assumed in the present operational discussion, and no further operation of the message reprogramming apparatus occurs until the flip-flop 35 is again placed in its set condition.

In a typical twelve-message reprogramming application, where each substitute message may approach one minute in length and where daily reprogramming with substitute messages is desired, the amount of tape available on conventional Philips-type cassettes operating at a tape speed appropriate for high-fidelity audio reproduction will be inadequate to contain a week's worth of substitute message sets. In order to overcome this problem and to ensure that message reprogramming is accomplished with only one personal visit to the programming apparatus each week, the substitute message sets for the seven consecutive days can advantageously be split between two cassettes. For example, the cassette placed in cassette unit A count contain four separate sets of substitute messages, corresponding to the first four days, while the remaining three sets of substitute messages could be contained on a second cassette for insertion in cassette unit B. The first and second cassettes can be keyed with the corresponding cassette units, such as by a slot positioned on the cassette exterior to mate with a correspondingly-positioned mating protrusion in the cassette loading receptacle of the cassette unit, to prevent a cassette from being inserted into the wrong cassette unit. At the end of the final separate message 17 associated with the last message set on each cassette, the occurrence of the twenty-second signal consisting of the five-second end signal S-3 and the fifteen-second tape end signal S-4 is detected by the twelve-second detector 40. A cassette transfer signal is applied along the line 26' to the cassette transfer switch 26, whereupon the signal output 24b, the message output 23b, and the control input 25b of cassette unit B are substituted by the multiple-pole double-throw function of the cassette transfer switch 26 for the previously-connected outputs and input of cassette unit A. The next message reprogramming operation of the apparatus, occurring in response to a set condition of the flip-flop 35, will cause delivery of the substitute messages from cassette unit B, and a tape end signal S-4 appropriately positioned at the end of the final separate message recorded on the cassette in cassette unit B will again cause an output to appear on the cassette transfer line 26' which controls the cassette transfer switch 26 to switch back to cassette unit A.

FAULT ALARMS

Assuming that fresh substitute message cassettes have been reloaded into the two cassette units, message substitution continues as set forth above. The absence of a fresh tape in the appropriate cassette unit is detected by an alarm circuit including the 25 -second timer 71 which provides a first-message alarm condition 25 seconds after first receiving an input from the coincidence gate 72. The coincidence gate 72 is connected to receive output from the flip-flop 35 in the set condition, and is additionally connected to receive the A = zero output of counter A. The 25-second time-out period of the timer 71 is selected to be slightly greater than the 20-second duration of blank tape extending from the beginning of the tape 10 to the first initial control signal S-1. As soon as the flip-flop 35 becomes set, the 25-second timer is enabled to commence its time-out period since the counter A was previously reset to A = zero. If a fresh tape is present in the proper cassette unit, the delivery of the two initial control signals S-1 and S-2 will occur before the expiration of 25 seconds, assuming a tape arrangement as disclosed herein, and the counter A is stepped from its initial A = zero position to remove an input from the coincidence gate 72. Failure of counter A to be stepped from zero for any reason, however, will produce a first-message alarm signal indicating that the apparatus is not ready to deliver a first message.

A two-minute timer 73 provides an announcer-unready alarm condition upon the expiration of a 2-minute period following first input from the coincidence gate 74. The coincidence gate 74 receives an input from the A>B line 45 of the comparator 37, and receives another input from the announcer-ready line 66 as inverted by the inverter 75. The presence of a cassette-ready signal on the line 45 is normally followed, in a time less than two minutes in the disclosed embodiment, by the presence of an announcer-ready signal on the line 66, and the announcer-ready signal is inverted at 75 to remove an input from the coincidence gate 74. Failure of the announcer-ready signal to occur within the time of period of the timer 73 causes an alarm condition signifying that the message reprogramming apparatus is ready to deliver a substitute message, but that the message announcing system has not signaled its availability to receive the substitute message.

A third timer 76 provides a stop-overrun alarm condition indicating that a message end signal S-3 on the tape 10 has been ignored by the apparatus for some reason. If each separate message 17 in the disclosed embodiment is assumed to have a maximum duration of about 50 seconds, for example, the timer 76 may be selected to provide a 75- second time-out. The timer 76 is controlled by a coincidence gate 77 connected to receive an output during the set condition of the flip-flop 35 and also connected to receive the A = B output 44 of the comparator 37. During normal operation of the cassette unit A or B, either the initial control signals S-1 and S-2, one of the end signals S-3, or a tape end signal S-4, will be received before the expiration of a 75-second period, causing the counter A to shift and the A = B output of the comparator to disappear. Failure of the tape signals to cause shifting of counter A within a 75-second period permits the timer 76 to produce a stop-overrun alarm condition.

Figure 3:
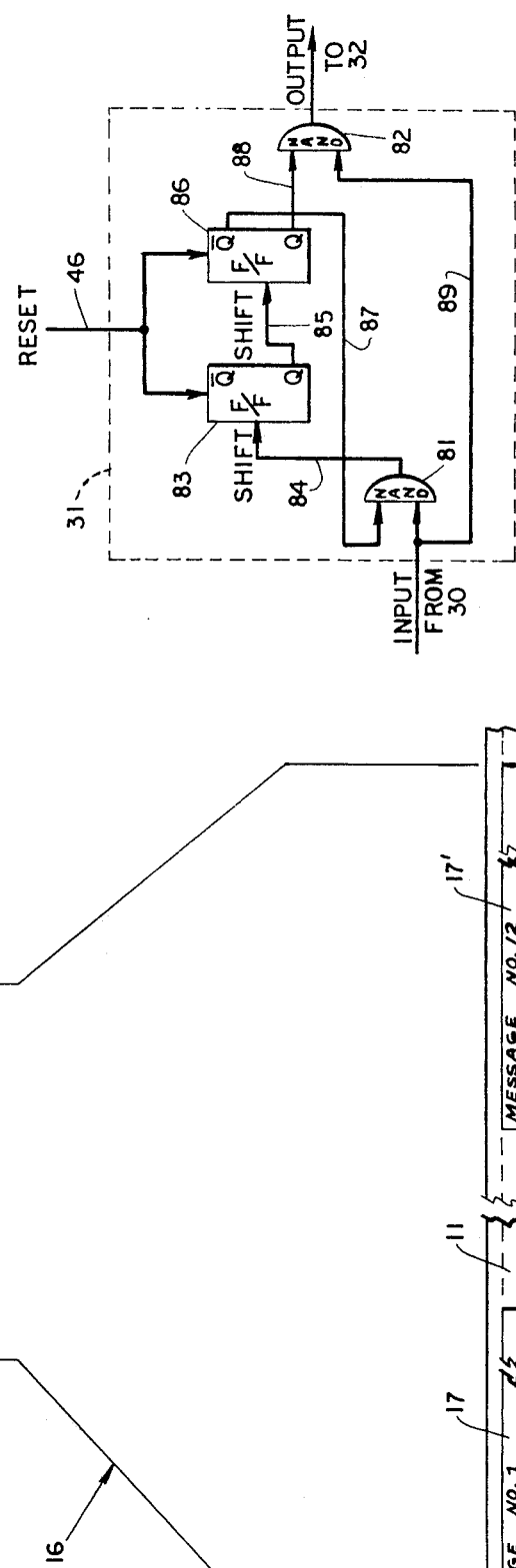
FIG. 3 shows an example of a less-one circuit used in the disclosed embodiment.

The details of a less-one circuit 31 which functions to absorb a first input pulse and to transmit subsequent input pulses until reset is shown in FIG. 3, although those skilled in the art will recognize that the present message reprogramming apparatus may utilize less-one circuitry of alternative design. The pulse inputs from the pulse shaping circuit 30 are applied as a first input to a two-input NAND gate 81, and also as an input to a two-input NAND gate 82. The shift input of an input flip-flop 83 is connected by the line 84 to receive the output of the first NAND gate 81, and the Q output of the input flip-flop is supplied by the line 85 to the shift input of an output flip-flop 86. The Q output of the output flip-flop 86 is connected by the line 88 to provide the other input to the NAND gate 81, while the $\overline{Q}$ output of the output flip-flop is connected by line 87 to provide the other input to the NAND gate 82. The output of the NAND gate 82 is connected to the shift input of counter A.

The less-one circuit 31 of FIG. 3, in the initial or reset condition, has both flip-flops 83 and 86 in the $\overline{Q}$ state, with the result that the NAND gate 82 is receiving a negative input on the line 88. Assuming that the first initial control signal S-1 is now applied at the input to the less-one circuit, the NAND gate 81 receives a positive input in addition to the positive $\overline{Q}$ input from the output flip-flop 86. However, the positive input signal applied on the line 89 to the NAND gate 82 has no effect because of the negative input applied on the line 88 to that NAND gate. The two positive inputs to the NAND gate 81 provide an output which causes the input flip-flop 83 to shift to provide a positive signal on its Q output. Although the output flip-flop 86 thus receives the positive Q output from the input flip-flop 83, the shift input circuit of the output flip-flop 86 is connected to be responsive only to negative-going signals, and so the state of the output flip-flop 86 remains unchanged at this time. Thus, no output is produced by the less-one circuit 31 in response to the first signal S-1.

Assume now that the second initial control signal S-2 is applied. The NAND gate 81 again applies a shift signal to the input flip-flop 83, whereupon the positive Q output is removed from the line 85. The removal of the positive Q signal from the shift input of the output flip-flop 86 provides a negative-going event causing the output flip-flop to shift, with the result that a positive input is applied on the line 88 to the NAND gate 82 and the previously-existing positive input applied on the line 87 to the NAND gate 81 is removed. The occurrence of a positive input on the line 88, concurrently with the second initial control signal S-2, provides an output signal from the NAND gate 82.

Since the positive signal remains on the line 88 until the output flip-flop 86 is reset, it will be seen that subsequent signals S-3 applied to the less-one circuit will produce corresponding output signals to the counter A. Since the positive signal has been removed from line 87, no further change in state of the flip-flops 83 and 86 can occur until a reset signal is applied on the line 46 to reset the two flip-flops to the initial state previously mentioned.

It will be understood, of course, that the foregoing relates only to a preferred embodiment of the present invention, and that numerous alterations and modifications may be made therein without departing from the spirit and the scope of the invention as set forth and defined in the following claims.

What is claimed is:

1. Apparatus for selective substitution of a message initially delivered by a message announcement delivery system, comprising:
   first means operative to repetitively provide a recorded initial message and to provide a commencement signal corresponding to the commencement of each such repetitive message;
   second means selectively operative to deliver a recorded substitute message in response to a command signal;
   control means operative at a predetermined time independently of said first and second means to provide a control signal corresponding to desired substitution of said substitute message for said initial message;
   a message transfer circuit selectively connected between said first means and said second means and operative to supply said substitute message from said second means to said first means; and
   substitution circuit means operative in response to said control signal and said commencement signal to provide said command signal to said second means.

2. Apparatus as in claim 1, wherein said first means provides said repetitive message to a message delivery circuit, and additionally including switch means normally connecting said message delivery circuit to said first means and operative in response to said command signal to connect said message delivery circuit to said message transfer circuit to receive said substitute message from said second means at the same time the substitute message is supplied to said first means.

3. Apparatus as in claim 2 wherein:
   said second means is operative to provide an end signal condition corresponding to the end of delivery of said substitute message; and
   said switch means is operative in response to the occurrence of said end signal condition to establish said normal connection of the message delivery circuit to said first means.

4. Apparatus as in claim 1 wherein:
   said second means is operative to provide an end signal condition corresponding to the end of delivery of said substitute message; and
   said substitution circuit means is operative in response to said end signal condition to terminate substitute message delivery by said second means.

5. Apparatus as in claim 1, wherein said second means is operative in response to the initial occurrence of a control signal to commence initial operation, and is operative to stop said initial operation in response to delivery of a recorded signal corresponding to the availability of a recorded substitute message for delivery.

6. Apparatus for serially providing a plural number of substitute messages to a message announcement system which provides a sequence of recorded initial messages, each of which is preceded by a ready signal comprising:
   first means selectively operative in response to a command signal for serially delivering a predetermined number of recorded substitute messages and serially delivering corresponding control signals in fixed time relation to each of the substitute messages;
   a message transfer circuit interconnecting said first means and the message announcement system and selectively operative to supply said substitute messages from said first means to the message announcement system;
   first counting means responsive to the control pulses delivered by said first means and operative to provide an output corresponding to the number of control signals delivered by said first means;
   second counting means responsive to a source of announcement system ready signals and operative to provide an output corresponding to the number of counted announcement system ready signals;
   means responsive to the outputs of said first and second counting means to provide a first signal condition when the count output on said first counting means is equal to the count output on said second counting means and to provide a second signal condition when the count on said first counting means is greater than the count on said second counting means;
   first circuit means responsive to said second signal condition and to the concurrent presence of a first ready signal corresponding to commencement of an initial message to be replaced by the first serial substitute message delivered by said first means to supply an announcement ready signal to said second counting means; and
   command circuit means operative in response to said first signal condition to provide said command signal to said first means, whereupon said first means commences delivery of the first serial substitute message to said message transfer circuit.

7. Apparatus as in claim 6, wherein:
   said first means is operative to deliver at least one control signal corresponding to the end of each serial substitute message and is additionally operative to deliver at least two control signals corresponding to the beginning of the first one of the predetermined number of serial substitute message in a set of substitute messages; and
   circuit means responsive to the control signals delivered by said first means and operative in response to said control signals to supply an initial counting input to said first counting means only in response to delivery of two control signals from said first means and additionally operative in response to each control signal delivered subsequent to said two control signals to supply a counting input to said first counting means.

8. Apparatus as in claim 7, further comprising:
   clock means operative to provide a start signal to said first means to initiate message substitution operation; and
   timing circuit means responsive to the clock means and to the occurrence of said initial counting input to provide an initial message alarm signal if said initial counting input is not supplied within a certain time after the start signal provided by said clock means.

9. Apparatus as in claim 7, further comprising:
   clock means operative to periodically provide an initial signal condition corresponding to desired initiation of message substitution;
   termination circuit means responsive to the count of said first counting means indicating delivery of the last of said predetermined number of substitute messages to terminate said initial signal condition.

10. Apparatus as in claim 9, wherein said first counting means and said second counting means are operative in response to said termination circuit means to be reset to an initial count corresponding to zero message delivery.

11. Apparatus as in claim 6, wherein the message announcement system normally provides the initial messages to a message delivery circuit, further comprising switch means normally connecting said message delivery circuit to receive the initial message announcement and responsive to said ready signal to connect said message delivery circuit to said message transfer circuit to receive said substitute message from said first means at the same time the substitute message is supplied to the message announcing system.

12. Apparatus as in claim 6, wherein:
said first means comprises a pair of recorded message playback means each of which is selectively operative in response to a playback signal condition received on a control circuit to deliver said recorded substitute messages on a message circuit and said corresponding control signal on a signal circuit;
playback transfer switch means connected to receive said playback circuit, said message circuit, and said signal circuit of each said playback means, and being operative to select said circuits from either playback means;
said playback message transfer circuit being connected to said transfer switch means for communication with said selected message circuit;
said command signal provided by said command circuit means being connected through said playback transfer switch means for communication with said selected control circuit;
said first counting means being connected to said playback transfer switch means for communication with said selected signal circuit; and
transfer switch actuating means connected to said selected signal circuit and operative in response to a playback transfer signal delivered on a selected signal circuit from one of said playback means to transfer said playback transfer switch means to the other said playback means.

13. Apparatus as in claim 12, wherein:
said transfer switch actuating means includes means responsive to a continuous tone of predetermined minimum duration delivered on said selected signal circuit by said one playback means to provide said transfer.

14. A recording medium containing a number of prerecorded substitute messages, comprising:
a recording medium having a message record track and a control record track, said message and control record tracks being coextensive with each other along the length of the recording medium;
said message track containing a plural number of serially recorded sets of substitute message signals, and each said set of substitute message signals including at least two separate serially recorded individual messages;
said control record track containing a first kind of control signal located on said recording medium in predetermined relation with the first individual message of each said set of substitute message signals;

said control record track containing a second kind of control signal located on said recording medium in predetermined relation with the end of each of said individual messages;
said control record track containing a third kind of control signal located on said recording medium in predetermined relation with the end of the final individual message in the final one of said serial sets of substitute message signals; and
each of said kinds of control signals having a signal characteristic which is distinguishable from the signal characteristics of the other kinds of control signals.

15. The recording medium as in claim 14, wherein said first control signal comprises a plural number of discrete control signals located on said control signal track of said recording medium in predetermined relation with said first individual message of each set of substitute message signals.

16. The recording medium as in claim 14, wherein each of said second control signals comprises a discrete control signal of first predetermined duration located on said control signal track in predetermined relation with the end location of said message track of each corresponding individual message, and said third control signal comprises a control signal of second predetermined duration exceeding said first predetermined duration and located on said control signal track in predetermined relation with the end location on said message track of said final individual message in the final set of substitute message signals.

17. The recording medium as in claim 14, wherein:
each of said control signals comprises a discrete control signal located on said control signal track in predetermined relation with the end location on said message track of each corresponding individual message; and
each of said first control signals comprises at least two discrete control signals located on said control signal track in predetermined relation preceding only the location on said message track of said first individual message of each set of substitute message signals.

18. The recording medium of claim 17, wherein each said second control signal has a first predetermined duration; and
said third control signal comprises a continuation of the second control signal corresponding with the end location on said message track of said final serial set of substitute message signals.

19. Apparatus for serially delivering a plurality of messages, comprising:
first means for serially delivering a plurality of recorded messages in a certain prearranged sequence;
switch means receiving said messages delivered by said first means and selectively operative to deliver each such message to any one of a plurality of message utilization circuits; and
control means operative in response to the serial delivery of messages delivered by said first means to count the number of delivered messages and to serially operate said switch means to serially deliver each said message to a certain corresponding utilization circuit in said certain prearranged sequence.

20. Apparatus for selective substitution of a message initially delivered by a message announcement delivery system, comprising:
- first means operative to repetitively provide a recorded initial message and to provide a commencement signal corresponding to the commencement of each such repetitive message;
- second means selectively operative to deliver a recorded substitute message in response to a command signal and operative to provide an end signal condition corresponding to the end of delivery of said substitute message;
- control means operative to provide a control signal corresponding to desired substitution of said substitute message for said initial message;
- a message transfer circuit selectively connected between said first means and said second means and operative to supply said substitute message from said second means to said first means;
- substitution circuit means operative in response to said control signal and said commencement signal to provide said command signal to said second means, and operative in response to said end signal condition to terminate substitute message delivery by said second means;
- timing means operative in response to the provision of said control signal to commence a timed period of operation and operative in response to the provision of said end signal to terminate said timed period; and
- said timing means being operative to provide an alarm signal condition at the end of an unterminated certain period of time corresponding to the duration of said recorded substitute message, and thereby indicating that said second means failed to deliver a timely end signal condition.

21. Apparatus for selective substitution of a message initially delivered by a message announcement delivery system, comprising:
- first means operative to repetitively provide a recorded initial message and to provide a commencement signal corresponding to the commencement of each such repetitive message;
- second means selectively operative to deliver a recorded substitute message in response to a command signal;
- control means operative to provide a control signal corresponding to desired substitution of said substitute message for said initial message;
- a message transfer circuit selectively connected between said first means and said second means and operative to supply said substitute message from said second means to said first means;
- substitution circuit means operative in response to said control signal and said commencement signal to provide said command signal to said second means;
- timing means operative in response to the provision of said control signal to commence a timed period of operation and operative in response to the commencement of said recorded substitute message to terminate said timed period; and
- said timing means being operative to provide an alarm signal condition at the end of an unterminated certain period of time corresponding to the duration of said recorded initial message, and thereby indicating that said recorded substitute message is not timely delivered.

22. Apparatus for selective substitution of a message initially delivered by a message announcement delivery system, comprising:
- first means operative to repetitively provide a recorded initial message and to provide a commencement signal corresponding to the commencement of each such repetitive message;
- second means selectively operative to deliver a recorded substitute message in response to a command signal;
- control means operative to provide a control signal corresponding to desired substitution of said substitute message for said initial message;
- a message transfer circuit selectively connected between said first means and said second means and operative to supply said substitute message from said second means to said first means;
- substitution circuit means operative in response to said control signal and said commencement signal to provide said command signal to said second means;
- timing means operative in response to the occurrence of said control signal to commence a timed period of operation and operative in response to said command signal to terminate said timed period; and
- said timing means being operative to provide an alarm signal condition at the end of an unterminated certain period of time, thereby indicating that said second means failed to receive a command signal.

23. Apparatus for selective substitution of a message initially delivered by a message announcement delivery system, comprising:
- first means operative to repetitively provide a recorded initial message and to provide a commencement signal corresponding to the commencement of each such repetitive message;
- second means selectively operative to deliver a recorded substitute message in response to a command signal;
- control means comprising a timing device operative independently of said first and second means to periodically provide a control signal corresponding to desired substitution of said substitute message for said initial message;
- a message transfer circuit selectively connected between said first means and said second means and operative to supply said substitute message from said second means to said first means; and
- substitution circuit means operative in response to said control signal and said commencement signal to provide said command signal to said second means.

24. Apparatus for serially providing a plural number of substitute messages to a message announcement system which periodically provides a corresponding number of separate recorded initial messages, comprising:
- first means selectively operative in response to a command signal for serially delivering a predetermined number of recorded substitute messages and for serially delivering corresponding control signals in fixed predetermined relation to each of said substitute messages;
- a message transfer circuit interconnected between said first means and the message announcement system and operative to supply said substitute messages from said first means to a message announcement system;

first circuit means responsive to the occurrence of said control signals to provide a first signal condition to the message announcement system indicating the availability of a predetermined substitute message;

second circuit means responsive to the concurrent occurrence of said first signal condition and a first message signal from the message announcement system indicating the commencement of the particular initial message to which said predetermined substitute message corresponds to provide said first means with command signal commencing substitute message delivery of said first means;

third circuit means responsive to the occurrence of a said control signal from said first means corresponding to the end of said predetermined substitute message to terminate said first signal condition and to provide a second signal condition corresponding to availability of the next one of said serial substitute messages;

an initiate circuit selectively operative to provide a substitute signal condition corresponding to desired delivery of said predetermined substitute messages;

said first means being operative in response to the presence of said substitute signal condition to commence operation for delivery of said first message signal; and fourth circuit means operative in response to occurrence of a control signal corresponding to termination of the final one of said predetermined number of serial messages to terminate said substitute signal condition of said initiate circuit.

* * * * *